United States Patent [19]

Walker

[11] 4,113,030

[45] Sep. 12, 1978

[54] TWO-WAY SCRAPER FOR GROUND TILLAGE DISCS

[76] Inventor: Harold G. Walker, 724 3rd St., Wakeeney, Kans. 67672

[21] Appl. No.: 758,655

[22] Filed: Jan. 12, 1977

[51] Int. Cl.² ............................................. A01B 23/06
[52] U.S. Cl. .................................................. 172/566
[58] Field of Search ............... 172/566, 563, 561, 558, 172/610, 609, 606

[56] References Cited

U.S. PATENT DOCUMENTS

| | | | |
|---|---|---|---|
| 1,534,489 | 4/1925 | Barnes | 172/566 |
| 3,045,765 | 7/1962 | Cox | 172/566 |
| 3,833,067 | 9/1974 | Peterson | 172/566 |
| 4,008,770 | 2/1977 | Boone | 172/566 |

*Primary Examiner*—Richard J. Johnson
*Attorney, Agent, or Firm*—Edwin L. Spangler, Jr.

[57] ABSTRACT

This invention relates to a two-way disc scraper for attachment to a ground tillage implement frame and, more specifically, to an improved pendulum type mounting therefor characterized by a supporting arm pivotally attached to a mounting bracket for side-to-side swingable movement between two operative positions on opposite sides of center and a biasing mechanism yieldably maintaining the arm in either of its operative positions comprising a tension spring connected between a crank movable with the support arm and a flop-over link.

6 Claims, 7 Drawing Figures

U.S. Patent  Sept. 12, 1978  4,113,030
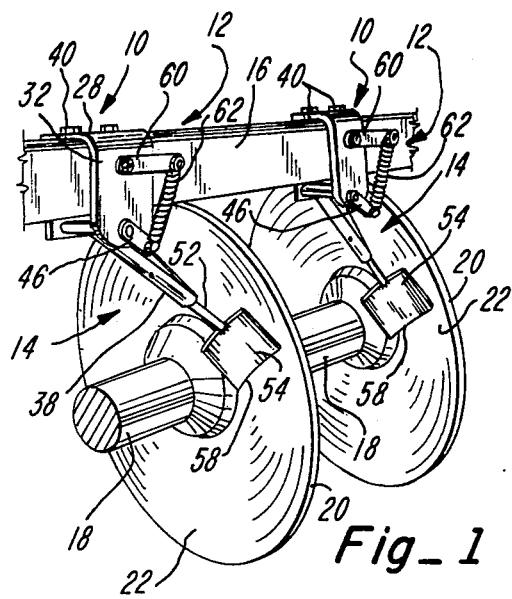
Fig_1
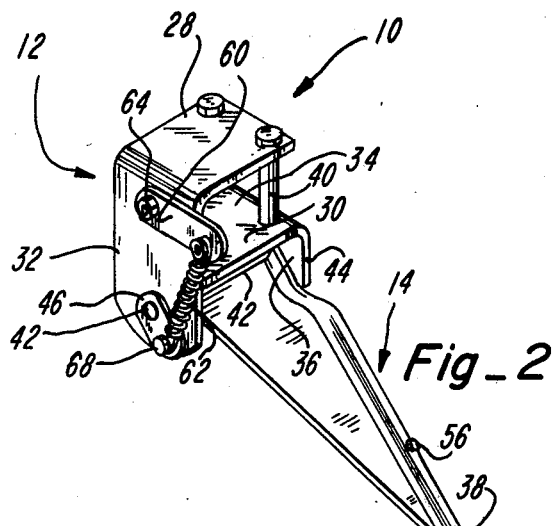
Fig_2
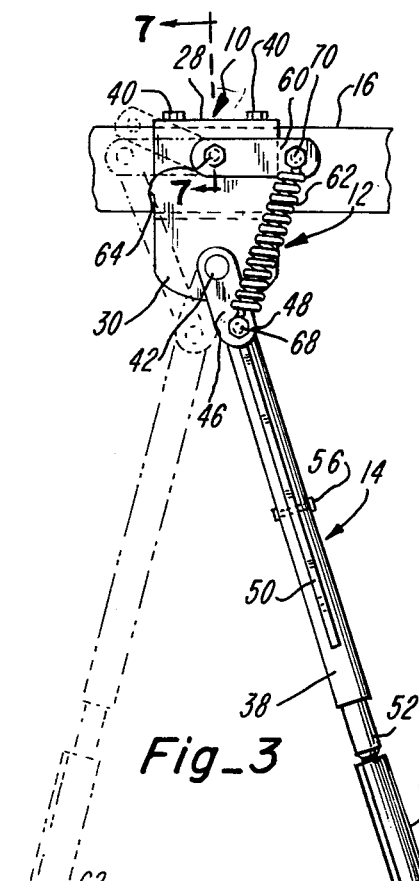
Fig_3
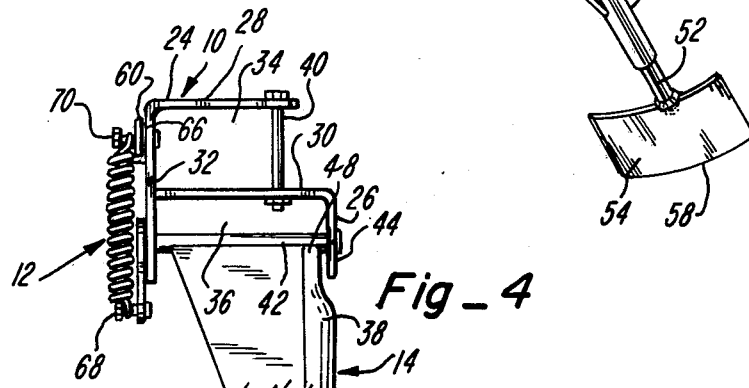
Fig_4
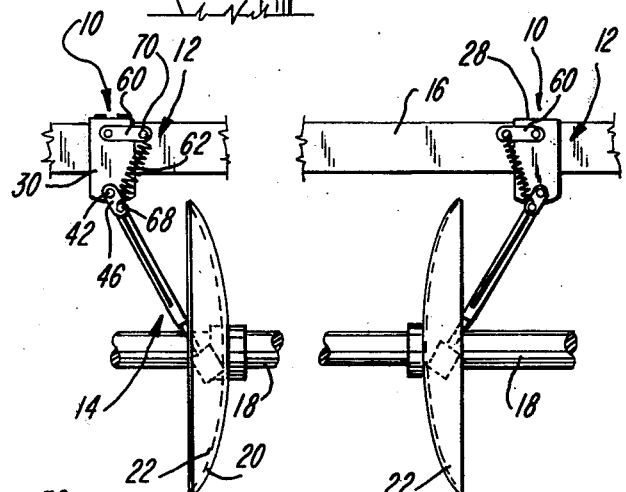
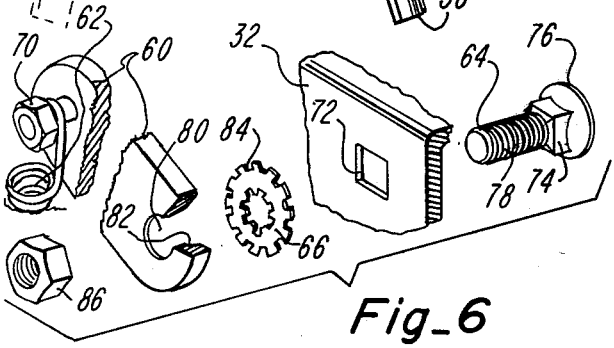
Fig_6
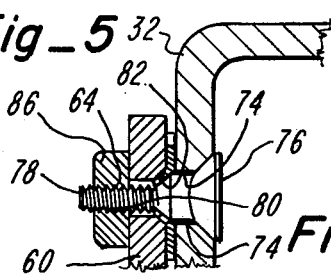
Fig_5
Fig_7

TWO-WAY SCRAPER FOR GROUND TILLAGE DISCS

Paddle-like scrapers for cleaning mud and other debris from the concave surface of ground tillage discs are well known in the art. Examples of such scrapers can be found listed in U.S. Pat. No. 4,008,770 issued on applicant's joint application U.S. Ser. No. 566,725 filed Apr. 10, 1975. All of these prior art disc scrapers are designed to scrape the concave surface of a ground tillage disc; however, each must be tailored for use with either a right-hand or left-hand disc, the latter terminology referring to which side of the scraper the concave disc surface to be scraped lies. In other words, not all disc type ground tillage implements have their disc facing in the same direction, i.e., to the right or to the left of the direction of travel. In fact, essentially all multiple-gang disc harrows of the type shown in U.S. Pat. Nos. 1,894,474; 3,516,499; 3,734,199; and, 3,845,825 include rows of discs facing both directions in the same implement.

It has now been found in accordance with the teaching of the instant invention that the necessity for providing two different scraper assemblies, one for right hand discs and another for left hand discs can be eliminated by the simple, yet unobvious expedient of providing a more or less universal one wherein the mounting subassembly for the disc can be swung from one side to the other as needed depending upon where the concavity is located. The real problem lies not so much with providing a scraper that can be swung from side-to-side between a pair of operative positions on either side of a medial one, but rather, one of being able to adjust the pressure with which the scraper blade presses against the disc to accommodate different operating conditions. This selfsame coupling, in the present instance at least, makes it unnecessary to carefully position the scraper assembly relative to the disc because the bias exerted upon the blade automatically maintains it in self-sharpening contact with the latter even after the disc or blade or both have begun to wear. The novel manner in which this problem is solved by applicant is not only simple, it involves no demounting of the unit from the implement frame or any reassembly of the scraper to accomplish the atlernate function.

Accordingly, it is the principal object of the present invention to provide a novel two-way disc scraper assembly for use with disc harrows.

A second objective is the provision of a device of the character described which is readily adaptable for use upon any of the conventional disc harrows both of the single-gang and multiple-gang designs.

Another object of the within described invention is to provide a disc scraper that includes a unique biasing mechanism which spring loads the blade against the disc regardless of which operative position it occupies while, at the same time, providing an adjustable mounting therefor.

Still another objective is the provision of a universal mounting for disc scrapers that requires no demounting, disassembly or reassembly to shift it from one operative position to the other.

An additional object is to provide a device of the type aforementioned which includes the added functional dimension of being able to swing the scraper out of the way in order to gain access to the disc for service, repair or replacement.

Further objects are to provide a swingable disc scraper which is simple, rugged, inexpensive, versatile, easy to repair, compact, readily adaptable to various sizes and shapes of discs, and one that is even somewhat decorative.

Other objects will be in part apparent and in part pointed out specifically hereinafter in connection with the description of the drawings that follows, and in which:

FIG. 1 is a fragmentary perspective view showing the improved disc scraper assembly in place to scrape the concave faces of a pair of adjacent discs;

FIG. 2 is a perspective view to an enlarged scale showing the scraper subassembly by itself;

FIG. 3 is a front elevation of the scraper assembly of FIG. 2 to approximately the same scale as the latter;

FIG. 4 is a fragmentary side elevation of the scraper assembly of FIGS. 2 and 3 showing it to the same scale but with portions thereof broken away to conserve space;

FIG. 5 is a front elevation to a reduced scale illustrating how the same scraper subassembly can be used to scrape either right hand or left hand discs;

FIG. 6 is an exploded view to an enlarged scale showing the elements fastening the link to the bracket for adjustable movement in both operative positions of the scraper subassembly so as to vary the spring bias on the latter; and, FIG. 7 is a fragmentary section to an enlarged scale taken along line 7—7 of FIG. 3.

Referring next to the drawings for a detailed description of the present invention it will be seen that reference numeral 10 has been employed to broadly designate the disc scraper assembly in its entirety while numeral 12 similarly refers to the biasing subassembly therefor and numeral 14 the pendulum type swingable arm. Crossframe member 16 comprises an integral part of the conventional implement frame which usually lies behind the primary supporting structure (not shown) for the shaft 18 upon which the discs 20 are mounted. One or more gangs of these discs are pulled along the ground to cultivate it by a suitable towing vehicle such as a tractor (not shown). Actually, the axis of the discs defined by shaft 20 is not perpendicular to the line of travel but rather at some angle thereto less or greater than 90°. Even so, for purposes of the present description, those discs mounted so that the concave surface 22 faces generally to the right of the direction of travel will be referred to as "right hand" discs while those opening to the left will be similarly designated "left hand" discs.

Mounting bracket 24, in the particular form shown, comprises two L-shaped members 26 and 28 welded together such that the horizontally-disposed leg 30 of one (26) is fastened intermediate the ends of the vertically-disposed leg 32 of the other thus cooperating to define a rearwardly-opening channel 34 sized to receive crossframe member 16 and a downwardly-opening channel 36 within the confines of which the disc supporting arm 38 is mounted for pendulum like swingable movement.

The cross frame element 16 of the implement frame is received within the rearwardly-opening channel 34 and secured therein by bolts 40. Of course, the bracket may be moved along frame member 16 to the proper position relative to the concave face 22 of disc 20 as indicated in FIGS. 1 and 5. Obviously, there are many different types and styles of brackets that can be employed to fasten the scraper to the implement frame, the one shown being merely representative thereof.

The downwardly-opening bracket channel 36 receives shaft 42 between the spaced parallel legs 32 and 44 thereof for rotational movement. Fixedly attached to the end of shaft 42 projecting onto the surface of bracket leg 32 is a crank arm 46. Also fixedly attached to shaft 42 for movement therewith is the flattened end portion 48 of hollow disc supporting arm 38. Arms 38 and 46 lie in essentially fixed spaced parallel relation to one another such that all movements of the former are duplicated by the latter. A triangular reinforcing web 50 is welded in the angle between arm 38 and shaft 42 in the particular form shown. Loosely housed inside hollow arm 38 is a rod 52 that carries the scraper blade 54 on its lower end. A retaining pin 56 is used to loosely secure rod 52 within arm 38 so that the blade 54 can wobble slightly in a matter well known in the art.

Blade 54 is essentially coplanar with shaft 42 so that its curved edge 58 will make essentially line contact with the concave surfaces 22 of both right and left hand discs as illustrated in FIG. 5. One key feature of the instant invention is the swingable mounting of the blade supporting arm subassembly 14 for movement between its two operative positions, both of which have been shown in FIG. 3, one in full lines and the second in broken lines. These alternative operative positions place the blade in scraping self-sharpening contact with the concave faces of either right or left hand discs as previously indicated.

Probably the most significant feature of the instant invention, however, is the yieldable shaft mounting subassembly 12 which biases the blade against the disc and permits the biasing force to be varied. This feature comprises a flop-over link 60 and a tension spring 62 connected between the free end of the latter and the corresponding end of crank arm 46. Link 60 is pivotally attached to the face of vertical bracket leg 32 by a bolt 64 which, in the particular form shown, lies in vertical alignment with shaft 42 and in spaced parallel relation thereabove. This fastener defines the pivot pin about which link 60 swings and, in addition, it cooperates with star washer 66 to fasten the link in any one of a number of adjusted positions on either side of the pivot thus enabling the user to vary the tension on spring 62 to suit different operating conditions. The free ends of both the link and crank arm remote from the ends thereof pivotally attached to the bracket are provided with headed fasteners 68 and 70 over which the ends of the tension spring 62 are hooked in the usual manner.

Referring briefly to FIGS. 6 and 7 for a detailed description of the particular way in which link 60 is secured in adjusted position, it will be seen that vertically-disposed leg 32 of the bracket has a square opening 72 therein sized and adapted to receive the square portion 74 behind the head 76 of bolt 64 and prevent the threaded shank 78 thereof from turning. The opening 80 in link 60 has a chamfered entryway 82 into which the toothed marginal edge 84 of star washer 66 is forced by nut 86. Loosening nut 86, of course, permits the link 60 to be swung into the horizontal position shown in full lines in several of the views and, in addition to positions other than a horizontal one as shown by broken lines in FIG. 3. In those instances where working conditions and other factors require that the spring tension biasing the scraper blade against the disc needs to be varied, the above adjustment provides such capability.

In either of the alternative operative positions of the support arm subassembly 14, the tension spring 62 lies on the same side of pivots 42 and 64 in position to bias the blade against the concave surface of the nearest disc on the same side. The full line position of FIG. 3 shows the assembly in the same position in which it is shown in FIGS. 1, 2 and the left side of FIG. 5, namely, to scrape a right hand disc as the latter has been previously defined. To shift the support arm and biasing subassemblies into the broken line position of FIG. 3 so as to scrape left hand discs as indicated on the right side of FIG. 5, one need only swing the arm subassembly to the left as viewed in those figures while, at the same time, loosening bolt 86 and flopping link 60 up and over to the same side as the latter before again securing the link in adjusted position. Regardless of the position of link 60, the biasing subassembly will function to bias the blade against the concave face of the adjacent disc on the same side thereof. It will also automatically adjust for wear, sharpen itself, and eliminate the need for precise positioning of the bracket along the crossframe member of the implement frame.

What is claimed is:

1. In a disc scraper assembly of the type having a bracket attachable to an implement frame above and to one side of the concave face of a ground tillage disc supported therebeneath and a blade-carrying arm subassembly depending from said bracket and extending downwardly therefrom into position to scrape said concave disc face, the improved connection between said arm subassembly and bracket which comprises: means carried by said bracket mounting said arm subassembly for pendulum-like relative pivotal movement therebeneath between a first operative position swung to one side of said axis of pivotal movement and a second operative position on the opposite side thereof, first spring attachment means carried by said arm subassembly for pivotal movement therewith between its operative positions, means carried by said bracket defining a second spring attachment means movable from a position on one side of the axis of pivotal movement of said arm subassembly to a second position on the other side thereof, and means comprising a tension spring connected between said first and second spring attachment means coacting therewith when both are positioned on the same side of said axis of pivotal movement to yieldably bias the supporting arm subassembly against a disc positioned on the same side thereof.

2. The improvement as set forth in claim 1 wherein the means carried by said bracket comprises a link pivotally attached thereto for independent movement between a first position projecting to one side of the axis of pivotal movement of said arm subassembly and a second position projecting to the other side thereof, said second spring attachment means being carried by said link in spaced relation to its axis of pivotal movement.

3. The improvement as set forth in claim 1 wherein the arm subassembly includes a first arm and a second arm paralleling the first, a scraper blade attached to the first arm, and in which said first spring attachment means is carried by said second arm for arcuate movement around the axis of pivotal movement of said arm subassembly.

4. The improvement as set forth in claim 2 wherein fastener means including a lock washer fastens the link to the bracket for adjustable movement to vary the spring tension on the arm subassembly in either of its operative positions.

5. The improvement as set forth in claim 2 wherein the axis of pivotal movement of the link lies in spaced substantially parallel relation above the axis of pivotal movement of the arm subassembly.

6. In a disc scraper assembly of the type having a bracket attachable to an implement frame above and to one side of the concave face of a ground tillage disc supported therebeneath and a blade-carrying arm subassembly depending from said bracket and extending downwardly therefrom into position to scrape said concave disc face, the improved connection between said arm subassembly and bracket which comprises: means carried by said bracket mounting said arm subassembly for pendulum-like relative pivotal movement therebeneath between a first operative position swung to one side of said axis of pivotal movement and a second operative position on the opposite side thereof, first spring attachment means carried by said arm subassembly for pivotal movement therewith between its operative positions, means carried by said bracket defining a second spring attachment means movable from a position on one side of the axis of pivotal movement of said arm subassembly to a second position on the other side thereof, means comprising a tension spring connected between said first and second spring attachment means coacting therewith when both are positioned on the same side of said axis of pivotal movement to yieldably bias the supporting arm subassembly against a disc positioned on the same side thereof; and spring tension adjustment means interposed between said second spring attachment means and said bracket effective upon actuation to position said second spring attachment means at any point intermediate said positions on opposite sides of its axis of pivotal movement.

* * * * *